Oct. 4, 1938.
W. H. SPIRE
2,132,054
ADJUSTABLE PITMAN
Original Filed March 19, 1936
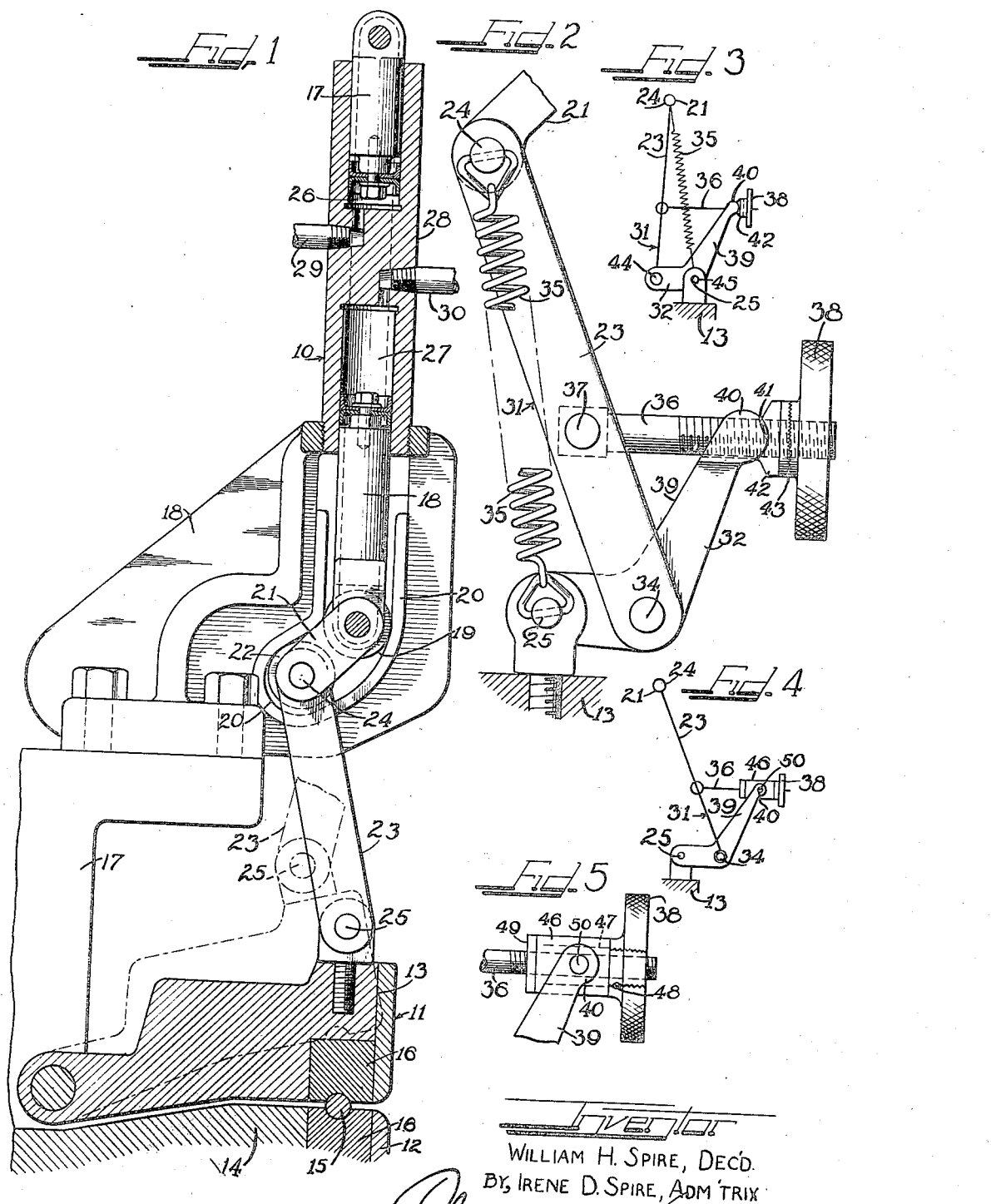
Inventor
WILLIAM H. SPIRE, DEC'D.
BY IRENE D. SPIRE, ADM'TRIX Patented Oct. 4, 1938

2,132,054

UNITED STATES PATENT OFFICE 2,132,054

ADJUSTABLE PITMAN

William H. Spire, deceased, late of Cleveland, Ohio, by Irene D. Spire, administratrix, Cleveland, Ohio, assignor to Thompson Products, Incorporated, Cleveland, Ohio, a corporation of Ohio Original application March 19, 1936, Serial No. 69,745. Divided and this application January 11, 1937, Serial No. 119,988

8 Claims. (Cl. 74—586)

This application is a division of application, Serial No. 69,745, filed on March 19, 1936, and entitled "Hydraulic force multiplying machine".

This invention relates particularly to an adjustable pitman or linkage, and it is described in the above-mentioned copending application as means to permit the ready adjustment of the effective length of a reciprocable clamp operator to compensate for the wear of removable inserts of the jaws of the clamp.

In the present application the invention is also described in connection with a clamp, but it is obvious that it is capable of use in other use associations.

It is an object of the present invention to provide a pitman with linkage means carried by the pitman to vary the effective length of its stroke.

It is also an object of this invention to provide a linkage or pitman with resilient means adjustable as to its position in the linkage to carry load on the up or down strokes, respectively, of the pitman.

It is also an object of this invention to provide a pitman with adjustable crank means connected to the pitman and interposed between the pitman and a work element operable by the pitman.

Other and further important objects will appear hereinafter.

Figure 1 is a side elevational view of a hydraulic machine with parts in plan, parts in section, and parts broken.

Figure 2 is a side elevational view of link adjusting means for the machine of Figure 1, with parts in section, parts in plan and parts broken.

Figures 3 and 4 are diagrammatic showings of modifications in the connection of the components of the means of Figure 2.

Figure 5 is a detail view of a part of the means of Figure 4, with parts in plan and parts broken.

In Figure 1 there is shown a hydraulic clamp actuating device indicated generally by the numerals 10. The device is the operator of a clamp in which the jaws are capable of being widely separated to permit the ready insertion or removal of the thing clamped. A clamp 11 is connected to the actuating device 10, and the clamp comprises a stationary lower jaw 12 and a hinged upper jaw 13, both of which are suitably mounted on a frame 14.

The clamp 11 is adapted to clamp a rod 15, between the jaws thereof, and the jaws are provided with removable inserts 16 having a working face of a desired shape and material to engage the rod 15.

When the clamp is used in connection with an electrical metal gathering machine the clamp is one terminal of an electric circuit, and current flows from the inserts 16 to the rod 15 as the rod is being pushed through the clamp towards an anvil which is the other terminal of the circuit.

The inserts are usually of copper, and the rod of steel, and the inserts become worn as the rod is pushed through them.

It has heretofore been necessary to place shims behind the inserts 16 to compensate for wear. New inserts are not always machined so accurately as to make them truly interchangeable, and shims had to be employed thus necessitating the services of a skilled fitter.

To eliminate shims, and the skilled labor necessary in placing and adjusting them, the means of the present invention were conceived so that the wear of the inserts 16 could be quickly compensated for by the operator of the metal gathering machine without having to put the machine out of production for the hitherto time-consuming job of fitting shims.

The clamp actuating device includes a pair of pistons 17 and 18 which are coupled together by suitable link means and to a roller 19 which travels in a guideway 20. The roller 19 is coupled by a link means 21 to a second roller 22 which also travels in the guideway 20, to impart force to a link or pitman 23 which is pivotally connected at its upper end, as at 24, to the roller 22, and is pivotally connected at its lower end, as at 25, to the hinged jaw 13, of the clamp 11.

The pistons 17 and 18, reciprocate in cylinders 26 and 27, respectively, formed in a cylinder block 28, and the cylinders 26 and 27, are connected to pipes 29 and 30, respectively, which become, alternately, pressure and suction lines of a hydraulic system so that one cylinder is connected to the pressure side of the system when the other is connected to the suction side of the system.

The wear-compensating means, indicated generally by the numerals 31, are connected between the pivotal connections 24 and 25 shown in Figure 1.

A crank 32 is pivotally connected to the clamp jaw 13 at 25, and a link 23 is pivotally connected to the crank at 34 and to the link 21 at the point 24.

The point 24 is, of course, also the point at which the link or pitman 23 is pivotally connected to the roller 22.

A coiled spring 35 extends between the points 24 and 25 and is connected to the link 21 and to the jaw 13, respectively, at these points.

A rod 36 is pivotally connected to the link 23, as at 37, and the free end of the rod 36 is threaded and is provided with a threaded nut 38 thereon. The inclined and free arm 39 of the crank 32 is provided with a bifurcated and curved end portion 40 which seats in a curved recess 41 of a bearing block 42 slidably mounted on the rod 36, and the block 42 is forced against the nut 38 by the free end 40 of the crank 32. The rear face of the bearing block 42, and the forward face of the nut 38, is each provided with teeth or corrugations 43 to prevent the accidental turning of the nut 38.

The spring 35 is of such a length that it exerts a pull at all times to take up back lash and to hold the curved end 40 of the crank 32 against the bearing block 42.

When the distance between the points 24 and 25, of Figure 1, should be increased to compensate for the wear of the inserts 16, the nut 38 is turned to force the arm 39 of the crank 32 towards the left, and the crank 32 and the link 33 being relatively movable about the point 34, the point 25 is forced down against the pull of the spring 35.

To decrease the distance between the points 24 and 25, as when a new insert 16 has been fitted in the jaw 13, the nut 38 is turned to move the arm 39 towards the right under the influence of the spring 35.

For the type of service already indicated, that of adjusting the effective length of the link connecting the points 24 and 25 of a clamp electrode operator, the link system 31 is devised to be in compression under heavy pressure and to be in tension only for such loads or pressures as are well within the capacity of the spring 35.

Should it be desired to accommodate the link adjusting system for conditions in which the load is light in compressing and heavy in lifting, the link 23 is then pivotally connected at its lower end to the end of the crank 32 as at 44, Figure 3, and the lower end of the spring 35 and the jaw 13 are connected to the crank as at 45, (pivot point 25). Should it be desired to accommodate the link adjusting system to conditions in which the load is equal in compression and in tension, the link 23 is then connected to the crank 32 as at 34, Figure 4, but the spring 35 is removed, and the arm 39 is now pivotally connected to a bearing block 46 which is connected to the nut 38 for movement therewith, as is shown in Figure 5. The nut 38 is provided with an extension in the form of a sleeve 47 which is threaded into the nut at one end and locked thereto by a pin 48 entered in aligned side bores in the nut and sleeve. The sleeve 47 is provided at its other end with an upstanding flange 49, which abuts the bearing block 46. The bearing block 46 is mounted revolvable on the sleeve, and it is provided with a pair of outstanding and oppositely directed lugs 50 which are entered in apertures in the end of the crank arm 39. It will be evident that when the nut and its sleeve are turned on the rod 36 the arm 39 will move in synchronism with the nut.

Being aware that many changes may be made and numerous details of construction may be varied through a wide range without departing from the principles of the invention, it is therefore not the purpose to limit the patent granted hereon otherwise than necessitated by the prior art.

What is claimed is:
1. A first reciprocable member, a second reciprocable member, a lever pivotally connected to said second member, a rigid link pivotally connected at one end to said first member and at its other end to said lever, and means connecting said link and said lever adjustable to vary the effective length of said link.

2. A first reciprocable member, a second reciprocable member, a lever pivotally connected to said second reciprocable member, a spring in tension connected extending between said first and said second members, a rigid link pivotally connected to said first member and said lever, and means connecting said link and said lever to vary the effective length of said link.

3. A first vertically reciprocable member, a second vertically reciprocable member, a rigid link pivotally connected with said first and second members, means to vary the effective length of said link, said means comprising a lever pivotally connected to said link and to said second member, and means adjustably connecting an end of said lever to said link at a point between the ends of said link.

4. A first reciprocable member, a second reciprocable member, a bell crank pivotally connected to said second member, a pitman pivotally connected to said first member and to said crank, spring means in tension connecting said first and said second reciprocable members, and means adjustably connecting an arm of said crank to said pitman at a point between the ends of said pitman.

5. A first reciprocable member, a second reciprocable member, a bell crank pivotally connected to said second member to present a single bent arm swingable about the pivotal connection, a pitman pivotally connected to said first member and also connected to said crank at a point on its bent arm, a spring in tension connecting said first and said second reciprocable members, and means adjustably connecting said crank arm to said pitman.

6. A first reciprocable member, a second reciprocable member, a bell crank pivotally connected to said second member to present a pair of arms swingable about the pivotal connection, a pitman pivotally connected to said first member and also pivotally connected to one arm of said crank, adjustable means connecting said pitman to the other arm of said crank, and a spring in tension connecting said first and said second reciprocable members.

7. A first reciprocable member, a second reciprocable member, a bell crank pivotally connected to said second member to present a bent lever swingable about the pivotal connection, a pitman pivotally connected to said first member and to said bent arm, and adjustable means connecting said pitman to the free end of said bent lever.

8. In a machine having a reciprocable thrust element and a work element of a clamp movably connected with said thrust element, a first reciprocable member, a rigid link pivoted at one end to said first member, a bell crank pivoted on the other end of said rigid link, a member pivoted on said rigid link intermediate the ends of said link and adjustably connecting said link with an end of said bell crank, and a second reciprocable member pivotally connected to said bell crank.

IRENE D. SPIRE,
*Administratrix of the Estate of William H. Spire, Deceased.*